United States Patent
Ramachandra et al.

(10) Patent No.: US 12,524,256 B2
(45) Date of Patent: Jan. 13, 2026

(54) GENERATING INSTALLATION IMAGES BASED UPON DPU-SPECIFIC CAPABILITIES

(71) Applicant: VMWARE, INC., Palo Alto, CA (US)

(72) Inventors: Karthik Ramachandra, Bangalore (IN); Aravinda Haryadi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 561 days.

(21) Appl. No.: 17/988,793

(22) Filed: Nov. 17, 2022

(65) Prior Publication Data
US 2024/0036896 A1 Feb. 1, 2024

(30) Foreign Application Priority Data
Jul. 26, 2022 (IN) .............................. 202241042791

(51) Int. Cl.
*G06F 9/455* (2018.01)
*G06F 9/4401* (2018.01)

(52) U.S. Cl.
CPC ........ *G06F 9/45541* (2013.01); *G06F 9/4416* (2013.01)

(58) Field of Classification Search
CPC .............. G06F 9/45541; G06F 9/4416; G06F 2009/45562; G06F 9/45558
See application file for complete search history.

(56) References Cited

U.S. PATENT DOCUMENTS

| | | | |
|---|---|---|---|
| 6,584,432 B1 | 6/2003 | Holzinger et al. | |
| 9,032,373 B1* | 5/2015 | Gupta | G06F 11/3688 717/127 |
| 10,685,033 B1* | 6/2020 | Searls | G06F 16/54 |
| 11,055,115 B1* | 7/2021 | Kudrin | G06F 9/545 |
| 11,068,243 B2* | 7/2021 | Modeel | G06F 8/41 |
| 11,803,407 B1* | 10/2023 | Gadalin | G06F 9/4856 |
| 11,863,406 B2* | 1/2024 | Johnson | H04L 41/5054 |
| 11,936,757 B1* | 3/2024 | Benny | H04L 61/4511 |
| 2014/0108722 A1* | 4/2014 | Lipchuk | G06F 9/45558 711/113 |
| 2014/0337850 A1 | 11/2014 | Iniguez | |
| 2015/0334696 A1* | 11/2015 | Gu | H04L 67/1095 718/1 |

(Continued)

OTHER PUBLICATIONS

Agrawal et al. "A many-core architecture for in-memory data processing." Proceedings of the 1-20 50th Annual IEEE/ACM International Symposium on Microarchitecture. 2017. Retrieved on Mar. 21, 2023 (Mar. 21, 2023) from <https:l/dl.acm.org/doi/abs/10.1145/3123939.3123985> entire document.

(Continued)

*Primary Examiner* — Dong U Kim
(74) *Attorney, Agent, or Firm* — King Intellectual Asset Management

(57) ABSTRACT

Disclosed are various embodiments provisioning a data processing unit in a host machine. There can be multiple data processing units within the host machine with varying hardware or software requirements for an installation image that can be utilized to provision the device. Multiple installation images can be generated for different data processing units having varying requirements in a heterogeneous environment.

20 Claims, 4 Drawing Sheets

(56) References Cited

U.S. PATENT DOCUMENTS

| | | | |
|---|---|---|---|
| 2016/0019085 A1 | 1/2016 | Khandekar et al. | |
| 2016/0239316 A1 | 8/2016 | Bronheim et al. | |
| 2017/0300311 A1* | 10/2017 | Vasquez Lopez | G06F 8/63 |
| 2019/0265985 A1* | 8/2019 | Cao | H04L 41/145 |
| 2019/0361728 A1* | 11/2019 | Kumar | H04L 67/34 |
| 2019/0392045 A1* | 12/2019 | De Lima Junior | G06F 12/0875 |
| 2020/0319925 A1* | 10/2020 | Clampitt, III | G06F 9/45558 |
| 2020/0387361 A1* | 12/2020 | Modeel | G06F 8/61 |
| 2021/0051116 A1* | 2/2021 | Kim | H04L 49/9015 |
| 2021/0182208 A1* | 6/2021 | Palmer | G06F 12/1491 |
| 2022/0174096 A1* | 6/2022 | Schmitt | H04L 67/1097 |
| 2022/0357974 A1* | 11/2022 | Gomez | G06F 9/45558 |
| 2024/0114073 A1* | 4/2024 | Wing | H04L 67/141 |

OTHER PUBLICATIONS

International Search Report and Written Opinion in PCT/US2023/011909 mailed Apr. 14, 2023.

* cited by examiner

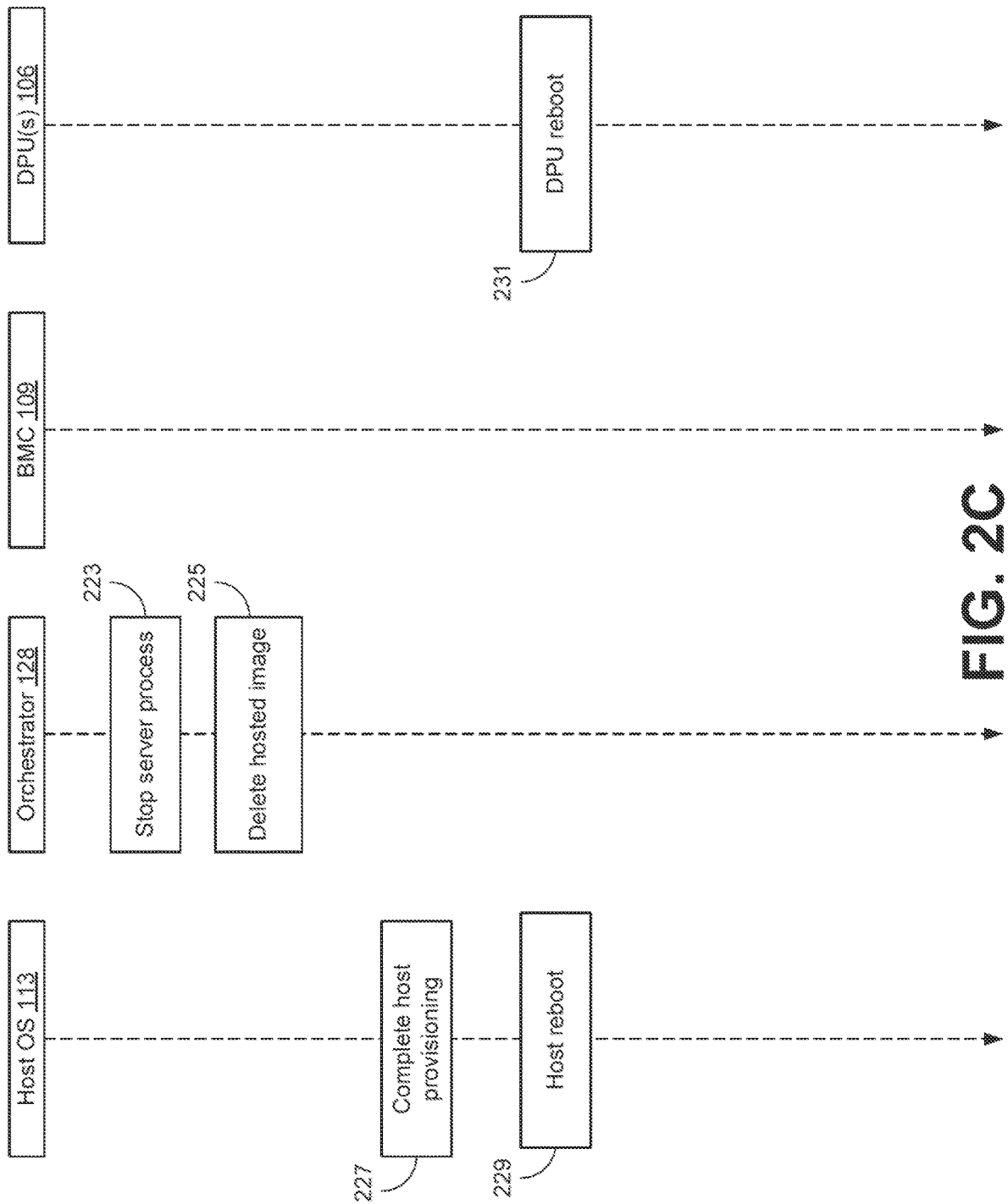

GENERATING INSTALLATION IMAGES BASED UPON DPU-SPECIFIC CAPABILITIES

RELATED APPLICATIONS

Benefit is claimed under 35 U.S.C. 119(a)-(d) to Foreign Application Serial No. 202241042791 filed in India entitled "GENERATING INSTALLATION IMAGES BASED UPON DPU-SPECIFIC CAPABILITIES", on Jul. 26, 2022, by VMware, Inc., which is herein incorporated in its entirety by reference for all purposes.

BACKGROUND

Modern computing devices often have dedicated offload cards installed in order to improve the performance or throughput for various tasks. These offload cards can be quite sophisticated, with their own, processors, memory, and operating system. The installation of an operating system or firmware on the offload cards is often done when the operating system on the host machine is also installed. For example, an installer process on the host machine can provision the offload cards as a part of an installation flow where configuration of the host machine is completed and where other hardware and software components on the host machine are configured or installed. Accordingly, if there are multiple offload cards within or accessible to the host machine that require configuration or provisioning, the process of provisioning these offload cards can be complex. In one scenario, a device can be equipped with offload cards that from different manufacturers. The firmware or software on these different cards can have different requirements for provisioning. This can make provisioning a device with a heterogenous mix of offload cards to be complicated to automate.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2C is a sequence diagram illustrating the interactions between the components of the host machine of FIG. 1 according to various embodiments of the present disclosure.

DETAILED DESCRIPTION

Disclosed are various approaches for coordinating the installation of an operating system onto a host machine as well as a respective operating system installed onto data processing units (DPU) of an operating system installed on a host machine. A DPU can be an offload card or a smart network interface card installed on a host machine that has its own CPU and other resources that require provisioning in addition to the host machine. During installation of an operating system on a host machine, the installation workflow can also require installation of an additional operating system or other configuration of a DPU installed in a host machine. In some cases, there can be many DPU's installed in a host machine that require configuration or provisioning. Accordingly, provisioning these DPU's can allow the overall provisioning of a host machine in which the DPU's are installed.

In some environments, the requirements for the different DPU's installed in a particular computing device can have varying requirements for provisioning. For example, a DPU from one manufacturer might require an ISO file, a DD file, a preboot execution environment (PXE) file, an MSI file, or another file format that a bootloader, firmware, or preloaded operating system can utilize to provision or configure the DPU. The DPU can also various other settings, drivers, scripts or other configuration steps to be taken to provision the DPU.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
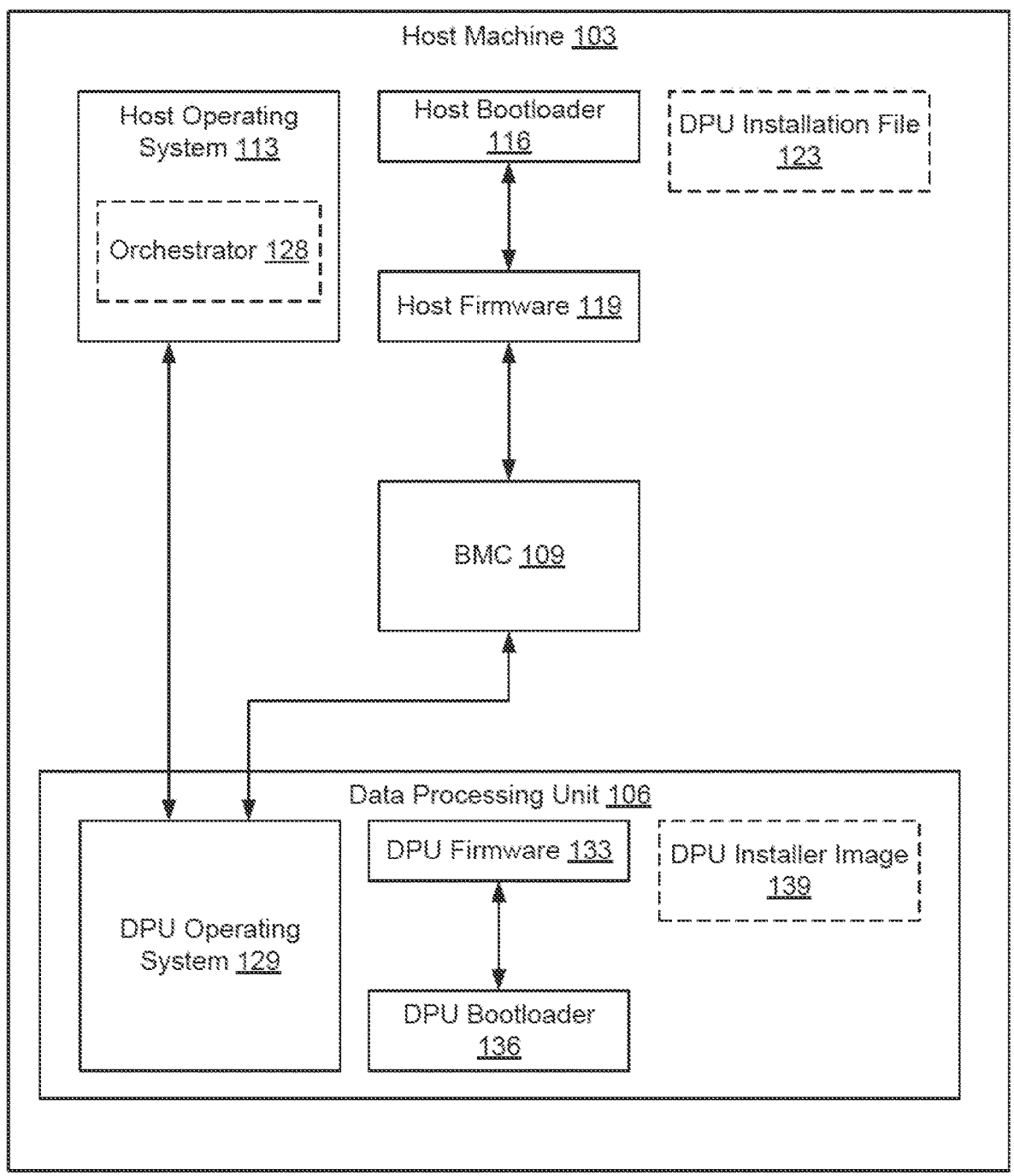
FIG. 1 is a drawing depicting a host machine according to various embodiments of the present disclosure.

FIG. 1 depicts a host machine 103 according to various embodiments of the present disclosure. The host machine 103 can include one or more processors, a memory, and/or a network interface. The host machine 103 can also include a data processing unit (DPU) 106 and a baseboard management controller (BMC) 109. The host machine 103 can be used to execute various applications or provide various computational resources to third-parties. For example, the host machine 103 could be configured to execute a hypervisor, which could facilitate the execution of one or more guest machines on the host machine 103. Accordingly, in various embodiments, the host machine 103 could execute a host operating system 113, a host bootloader 116, and/or host firmware 119. A host bootloader 116 can facilitate booting of a host operating system 113 from a boot image.

The host operating system 113 can include any system software that manages the operation of computer hardware and software resources of the host machine 103. The host operating system 113 can also provide various services or functions to computer programs that are executed by the host machine 103. For example, the host operating system 113 may schedule the operation of tasks or processes by the processor of the host machine 103. The host operating system 113 may also provide virtual memory management functions to allow processes executing on the host machine 103 to have its own logical or virtual address space, which the host operating system 113 can map to physical addresses in the memory of the host machine 103. When referring to the host operating system 113, the host operating system 113 can include both hypervisors and/or any other system software that manages computer hardware and software resources.

The host bootloader 116 can represent a program responsible for booting the host operating system 113 in response to the host machine 103 being powered on.

The DPU installation file 123 represents a file containing an uncompressed file archive, such as a directory, tar ball, folder, or other file archive that contains the files, scripts, and other resources needed to provision a DPU. The DPU installation file 123 can include the files from which a DPU installer image 139 can be generated by the orchestrator 128 or another application or process. The DPU installation file 123 can contain metadata, binaries, installers, and other data that can be compressed and placed into an image file of an appropriate format according to the hardware and/or software requirements of a particular DPU 106 that is being provisioned by the orchestrator 128.

Examples of the disclosure can allow an installation application or service to install a fresh operating system or an updated operating system onto the host machine 103 as well as one or more DPU 106 installed in the host machine 103. A user can initiate provisioning of the host machine 103 to install software on the device, such as a bare-metal hypervisor that allows the host machine 103 to execute virtual machines that can support workloads such as virtual desktop infrastructure, server infrastructure, datacenter operations, or any other workloads needed by a customer provisioning the host machine 103. The host machine 103 can represent a server that is being provisioned for an enterprise.

The host operating system 113 can execute an installer process that can orchestrate the installation process. The process is referred to herein as the orchestrator 128. The orchestrator 128 can oversee installation of a host OS image on the host machine 103. The orchestrator 128 can also oversee provisioning of one or more DPU 106 of the host machine 103 utilizing the DPU installation file 123, from which platform specific DPU installation images can be generated depending upon the requirements of the particular DPU 106.

The host firmware 119 can include software embedded in the host machine 103 to provide a standardized operating environment for more complex software executing on the host machine 103. For example, the PC-compatible Basic Input/Output System (PC-BIOS) used by many desktops, laptops, and servers initializes and tests system hardware components, enables or disables hardware functions as specified in the PC-BIOS configuration, and the loads the host bootloader 116 from memory to initialize the host operating system 113 of the host machine 103. The PC-BIOS also provides a hardware abstraction layer (HAL) for keyboard, display, and other input/output devices which may be used by the host operating system 113 of the host machine 103. The Unified Extensible Firmware Interface (UEFI) provides similar functions as the BIOS, as well as various additional functions such as Secure Boot, a shell environment for interacting with the host machine 103, network connectivity for the host machine 103, and various other functions.

The DPU 106 can represent an offload card installed on the host machine 103 to accelerate the processing of various types of compute workloads. Accordingly, the DPU 106 can include at least one processor, memory, and (in some implementations), one or more network interfaces. DPUs 106 can be used, for example, to accelerate network packet processing (e.g., for a firewall, software defined switch, etc.), input/output operations for local or network storage, or other computational workloads. In other instances, the DPU 106 can be used to execute applications that would typically be executed by the central processor unit (CPU) of the host machine 103, to make the resources of the CPU of the host machine 103 available for other tasks. For example, the DPU 106 could execute a hypervisor so that the resources of the CPU of the host machine 103 could be fully dedicated to the guests executing on the host machine 103. Accordingly, in various embodiments, the DPU 106 could execute a DPU operating system 129, a DPU firmware 133, and a DPU bootloader 136.

The DPU operating system 129 can include any system software that manages the operation of computer hardware and software resources of the DPU 106. The DPU operating system 129 can also provide various services or functions to computer programs that are executed by the DPU 106. For example, the DPU operating system 129 may schedule the operation of tasks or processes by the processor of the DPU 106. This could include network packet processing, network packet processing (e.g., for a firewall, software defined switch, etc.), input/output operations for local or network storage, or other computational workloads.

In implementations where the functionality of a hypervisor is implemented by the DPU 106, the DPU operating system 129 may also provide virtual memory management functions to allow processes executing on the host machine 103 to have its own logical or virtual address space, which the DPU operating system 129 can map to physical addresses in the memory of the host machine 103. When referring to the DPU operating system 129, the DPU operating system 129 can include both hypervisors and/or any other system software that manages computer hardware and software resources.

The DPU firmware 133 can include software embedded in the DPU 106 to provide a standardized operating environment for more complex software executing on the DPU 106. For example, the PC-compatible Basic Input/Output System (PC-BIOS) used by many desktops, laptops, and servers initializes and tests system hardware components, enables or disables hardware functions as specified in the PC-BIOS configuration, and the loads the DPU bootloader 136 from memory to initialize the DPU operating system 129 of the DPU 106. The PC-BIOS also provides a hardware abstraction layer (HAL) for keyboard, display, and other input/output devices which may be used by the DPU operating system 129 of the DPU 106. The Unified Extensible Firmware Interface (UEFI) provides similar functions as the BIOS, as well as various additional functions such as Secure Boot, a shell environment for interacting with the DPU 106, network connectivity for the DPU 106, and various other functions.

The DPU bootloader 136 can represent a program responsible for booting the DPU operating system 129 in response to the DPU 106 being powered on. Once execution of the DPU bootloader 136 is initiated, the bootloader can select either the DPU installer image 139 or a DPU alternate boot image to boot the DPU operating system 129.

The DPU installer image 139 represents a disk image containing a copy of the current version of the DPU operating system 129 to be executed by the DPU 106. The DPU installer image 139 can also include configuration information and state information, such as whether the most recent boot using the DPU installer image 139 had failed. A DPU installer image 139 can be generated by the orchestrator 128 from the DPU installation file 123 depending upon the requirements of the hardware manufacturer, the DPU firmware 133, and/or the DPU installer image 139. For example, a first DPU 106 installed in the host machine 103 might require an ISO file to install and configure the DPU operating system 129. A second DPU 106 installed in the host machine 103 might require a DD file or a PXE file to install and configure the DPU operating system 129 on the DPU 106. For example, a first respective DPU installation image comprises an ISO file, a second respective DPU installation image comprises a PXE file, and a third respective DPU installation image comprises a DD file.

The orchestrator 128 can manage the installation process of a DPU installer image 139 on a DPU 106. In one example, the orchestrator 128 can create or provide an installation executable or image that can be installed by the DPU bootloader 136 or another process on the DPU 106. The installation executable or image can be the DPU installer image 139 that is provided to the DPU 106 to provision a DPU operating system 129 on the DPU 106.

The orchestrator 128 can execute a server process from which the DPU 106 and/or BMC 109 can retrieve an installation image and install the DPU operating system 129 onto the DPU 106 when the host machine 103 is being provisioned. In examples of this disclosure, the process of spawning a server process to provide to the respective DPU's 106 in the host machine 103 can be executed or continued in parallel with an installation flow that installs and/or configures the host operating system 113 on the host machine 103. Additionally, in the case of multiple DPU's 106 on the host machine 103, the respective server processes can be executed in parallel with one another. In this way, provisioning each of the respective DPU's 106 in the host machine 103 should not act as a bottleneck that slows the installation and configuration process of the host machine 103. The server process can represent an HTTP server, an FTP server, or any other server that supports file transfer between network nodes.

The BMC 109 represents a specialized microcontroller embedded on the motherboard of the host machine 103 that provides an interface between system management software (such as the host operating system 113 or host firmware 119) and the hardware of the host machine 103. This can include, for example, providing a serial console over a network connection or other out of band communications and control mechanisms for the host machine 103. The BMC 109 can also provide out of band communications channels between hardware components of the host machine 103, such as between the DPU 106 and other components of the host machine 103. In some implementations, the BMC 109 can include its own memory, processor, and optimized embedded firmware.

The orchestrator 128 represents a process or application that can facilitate installation of software on the host machine 103. The orchestrator 128 can be a module within an installer application that can install or configure the host operating system 113 on the host machine 103. The orchestrator 128 can also provide an installation image or application that a DPU 106 can utilize to install or provision the DPU operating system 129 on the DPU 106.

The orchestrator 128 can also execute one or more scripts or processes to generate the DPU installer image 139 that is provided to the DPU 106 when the DPU 106 is being provisioned. The orchestrator 128 can also quiesce the DPU 106 that is being configured. Further, the orchestrator 128 can remove or disable one or more drivers associated with the DPU 106 as the DPU operating system 129 is being installed on the DPU 106 to suppress or eliminate hardware or software alerts generated by the DPU 106 during provisioning.

Figure 2A:
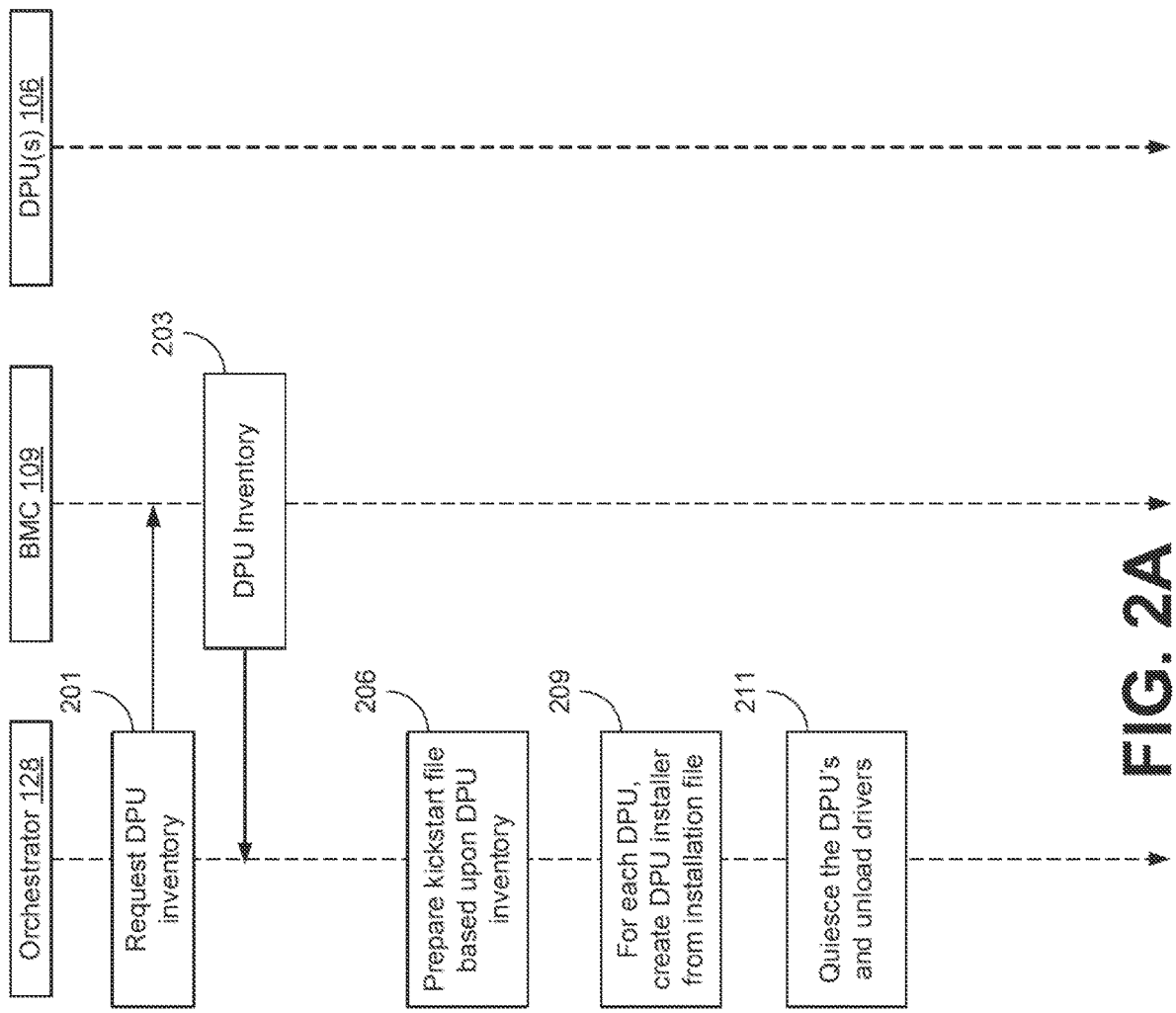
FIG. 2A is a sequence diagram illustrating the interactions between the components of the host machine of FIG. 1 according to various embodiments of the present disclosure.
Figure 2B:
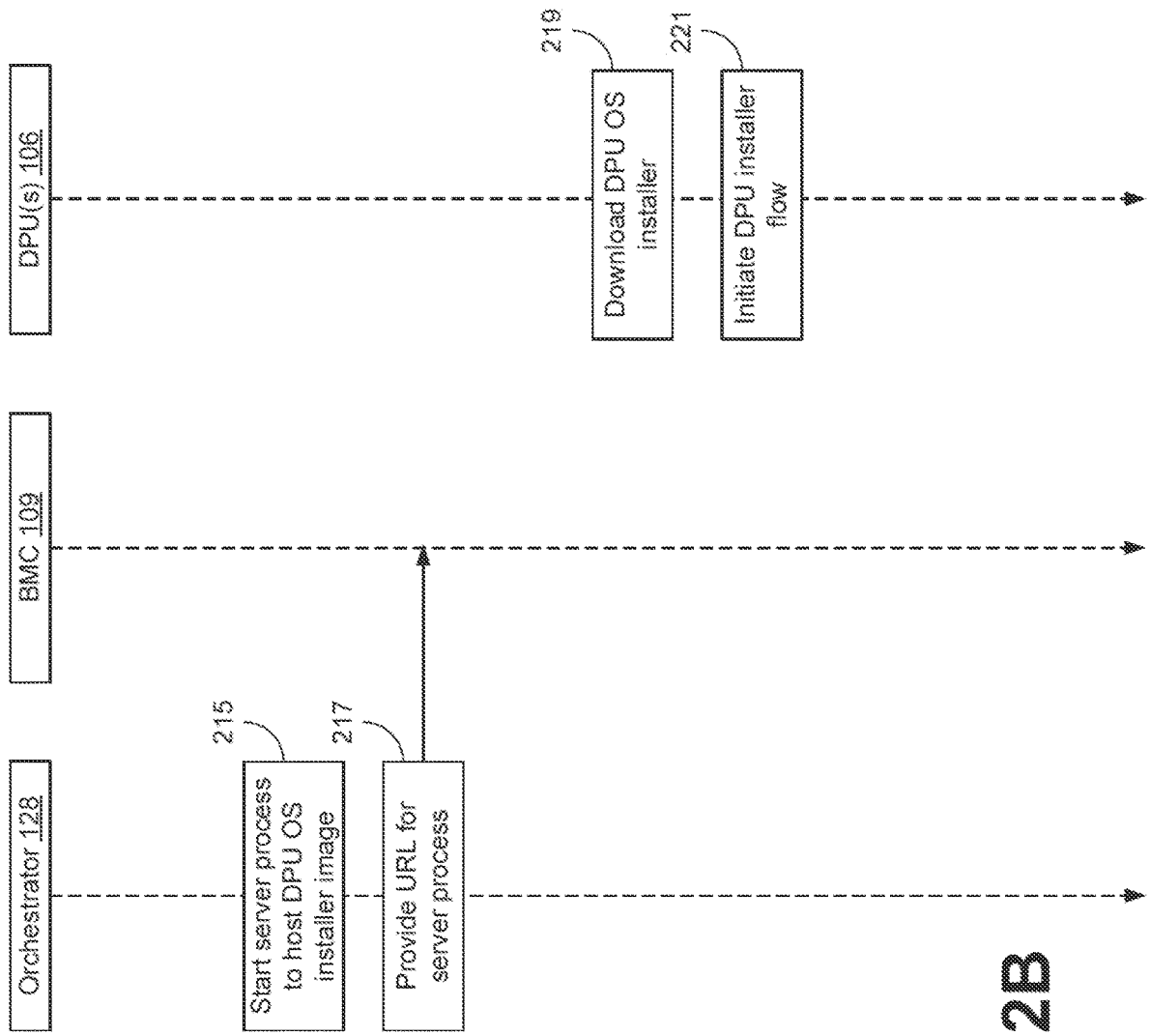
FIG. 2B is a sequence diagram illustrating the interactions between the components of the host machine of FIG. 1 according to various embodiments of the present disclosure.

Referring next to FIG. 2, shown is a sequence diagram that provides one example of the interactions between the components of the host machine 103. The sequence diagram of FIG. 2 provides merely an example of the many different types of interactions between the components of the host machine 103 according to the various embodiments of the present disclosure. As an alternative, the sequence diagram of FIG. 2 can be viewed as depicting an example of elements of a method implemented within the host machine 103. As a result of the process depicted in FIG. 2, DPU operating system 129 can be installed or configured onto one or more DPU 106 installed within a host machine 103. The process shown in the subsequent sequence diagrams can result in the various DPU 106 installed within a host machine 103 to be provisioned or configured with a DPU operating system 129.

Beginning with block 201, the orchestrator 128 can request a DPU 106 inventory to discover the hardware or software requirements of the one or more DPU 106 installed in the host machine 103. The orchestrator 128 can request the DPU 106 inventory from the BMC 109. The BMC 109 can query the hardware resources installed on the host machine 103 to determine a manufacturer or type DPU 106 associated with the host machine 103. In some implementations, the DPU's 106 installed on the host machine 103 can advertise their respective capabilities, which can include requirements for an DPU installer image 139 to provision the respective DPU 106. For example, the requirements can include a manufacturer identifier, a hardware address, such as a MAC address, or another identifier from which the BMC 109 can determine the installation requirements for a DPU installer image 139 that is needed to provision the DPU 106.

At step 203, the BMC 109 can provide the DPU inventory to the orchestrator 128. The DPU inventory can include a list or other data structure that specifies the hardware requirements or a list of hardware identifiers that identifies the various DPU's 106 installed in the host machine 103.

At step 206, the orchestrator 128 can generate a kickstart file for each DPU 106 based upon the DPU inventory obtained at step 203. A kickstart file can represent an installation script that can guide the installation workflow to install and configure a DPU operating system 129 on a respective DPU 106. A kickstart file can be generated for each DPU 106 installed in a host machine 103. The kickstart file for each DPU 106 can include instructions or commands that execute an installer process for a installer embedded within a DPU installer image 139, configure operating system parameters, network addresses or parameters, and other configurable parameters of a DPU operating system 129 that can be provisioned, installed or configured on a respective DPU 106.

At step 209, the orchestrator 128 can generate a DPU installer image 139 for each DPU 106 installed in the host machine 103 or that is in the DPU inventory obtained at step 203. As noted above, the DPU inventory can specify a type of installation image that is required by the DPU 106 so that a DPU operating system 129 can be installed or configured on the DPU 106. The DPU operating system 129 installation image can be provided to a respective DPU 106 in the host machine 103 so that the DPU 106 can be provisioned with an operating system, such as a bare metal hypervisor or a complementary operating system to a bare metal hypervisor running on the host machine 103. The DPU installer image 139 can be generated from the DPU installation file 123. The DPU installation file 123 can be provided by a user or a process that installs host operating system 113 on the host machine 103. The DPU installation file 123 can also be obtained from an installation image that is utilized to install a host machine 103 operating system. The DPU installation file 123 can also be obtained from a network source that is remotely located from the host machine 103.

The orchestrator 128 can generate a DPU installer image 139 according to a format associated with the requirements of a particular DPU 106. For example, a DPU from one manufacturer might require an ISO file, a DD file, a preboot execution environment (PXE) file, an MSI file, or another file format that a bootloader, firmware, or preloaded operating system can utilize to provision or configure the DPU.

The DPU can also provide various other settings, drivers, scripts or other configuration steps to be taken to provision the DPU.

The DPU installation file 123 represents a file containing an uncompressed file archive, such as a directory, tar ball, folder, or other file archive that contains the files, scripts, and other resources needed to provision a DPU. The DPU installation file 123 can include the files from which a DPU installer image 139 can be generated by the orchestrator 128 or another application or process. The DPU installation file 123 can contain metadata, binaries, installers, and other data that can be compressed and placed into an image file of an appropriate format according to the hardware and/or software requirements of a particular DPU 106 that is being provisioned by the orchestrator 128.

At step 211, the orchestrator 128 can quiesce the DPU 106 that are being provision with a DPU installer image 139. Each DPU 106 can be quiesced so that the data is brought into a stable state that is suitable for backups or other operations. Each DPU 106 in the host machine 103 can be quiesced and the drivers unloaded so that the DPU 106 does not trigger interrupts or other hardware or software alerts that can interrupt or slow the operation of the host machine 103 during provisioning of the DPU 106.

The host operating system 113 or the orchestrator 128 can continue execution of a host machine 103 installation flow that installs a host operating system 113 on the host machine 103 or that configures and/or provisions the host operating system 113 on the host machine 103 in parallel with the flow that creates the various DPU installer image 139 for the DPU's 106.

At step 215, the orchestrator 128 can initiate a server process to host the DPU installer image 139 generated or obtained at step 209. The server process can be running on the host machine 103, and the DPU 106 can communicate with the server process using a network stack that is available to the DPU 106. The BMC 109 can provide the ability for the DPU 106 and the host machine 103 to communicate using a network stack.

In one implementation, the orchestrator 128 can create a server process for each DPU 106 in the host machine. In another implementation, the orchestrator 128 can create a single server process that can handle requests from multiple DPU 106 that are utilizing the same format of DPU installer image 139.

Accordingly, at step 217, the orchestrator 128 can provide the uniform resource locator (URL) or network address of the server process to the BMC 109. The BMC 109 can provide a networking stack or networking capability to the DPU 106 so that the host machine 103 and the DPU 106 can communicate using networking protocols.

At step 219, the DPU 106 can download the DPU installer image 139 provided by the server process created by the orchestrator 128. The DPU installer image 139 can represent an installation image that can be installed by the DPU bootloader 136 or another provisioning service on the DPU 106, such as a process provided by the DPU firmware 133 to install an operating system on the DPU 106. The DPU installer image 139 can represent an ISO image, a DD file, a PXE file, or an executable file in a format that is compatible with the DPU firmware 133 or the DPU bootloader 136 according to the particular specifications of the respective DPU 106.

At step 221, the DPU 106 can initiate a DPU installation flow. The DPU installation flow can represent an installer that installs and configures an DPU operating system 129 onto the DPU 106. The DPU operating system 129 can execute the installer workflow so that the installer can install a bare metal hypervisor, a server operating system, a network stack, or any other software component or operating system onto the DPU 106 so that the DPU 106 can work with the host machine 103 to facilitate user workloads and other tasks. The DPU installer workflow can install a DPU operating system 129 onto the DPU 106 that the DPU bootloader 136 can boot whenever DPU 106 is powered up or rebooted.

The DPU installer workflow can provide an indication of completion to the BMC 109. For example, the DPU bootloader 136 can boot a DPU boot image when the installer workflow has completed so that the DPU 106 is powered on and begins to boot. The DPU operating system 129 can provide a success signal upon bootup of the DPU 106 if the DPU 106 successfully boots the DPU operating system 129.

However, if the DPU operating system 129 fails to successfully boot from the DPU boot image, then the DPU 106 may not provide an indication of completion to the BMC 109 at step 219. For example, the BMC 109 or orchestrator 128 can determine after a timeout period that the installer did not successfully complete. In this scenario, the BMC 109 or the orchestrator 128 can determine that the DPU installer workflow was unsuccessful and take one or more remedial actions. In one example, the orchestrator 128 can report the failure of the DPU installation workflow to the host operating system 113 or a user monitoring the installation flow implemented by the orchestrator 128 so that the user can intervene. In another scenario, the orchestrator 128 can restart the DPU installation workflow on the DPU 106 or power cycling the DPU 106.

The host bootloader 116 can determine whether the DPU operating system 129 has successfully booted by polling the BMC 109 to determine whether the DPU operating system 129 has sent a ready signal to the BMC 109. Failure to receive a ready signal from the DPU operating system 129 within a predefined time period could serve as an indicator that the DPU operating system 129 has failed to boot.

The BMC 109 can provide the indication of completion of the DPU installation flow to the orchestrator 128. As noted above, the orchestrator 128 can monitor potentially multiple DPU installation flows corresponding to multiple DPU 106 in the host machine 103. The steps shown in FIGS. 2A-2C can be performed in parallel with an installation flow carried out by the orchestrator 128 or another process to install and configure a host operating system 113 on the host machine 103. In this way, the DPU installation flow for potentially multiple DPU 106 and an installation flow for the host operating system 113 can operate in parallel, which can speed the provisioning of the host machine 103 relative to conducting the respective installation flows in series.

At step 223, the orchestrator 128 can stop the server process that was spawned to serve the DPU installer image 139 to the respective DPU 106 within the host machine 103. The server process can be stopped upon completion of the DPU installation flow for the respective DPU 106 that obtained the DPU installer image 139 from the orchestrator 128. At step 225, the orchestrator 128 can delete the hosted DPU installer image 139.

At step 227, the host machine 103 provisioning and configuration can be completed. In one example, the orchestrator 128 can determine that the installation flow for the host operating system 113 has completed and that the DPU installation flow for the respective DPU 106 in the host machine 103 are also completed.

At step 229, the host machine 103 can reboot upon completion of host machine 103 provisioning and configuration. At step 231 the DPU 106 can reboot upon completion of host machine 103 provisioning and configuration. In one example, reboot of the host machine 103 and the DPU 106 can be performed in parallel. Additionally, in some implementations of a host machine 103, there can be multiple DPU 106 installed in a host machine 103. The steps of providing a DPU installer image 139 can be performed by or on behalf of each DPU 106 installed in a host machine 103.

Several software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
   a computing device comprising a central processor unit (CPU) and a plurality of data processing units (DPU);
   a first set of machine-readable instructions that, when executed by the CPU, cause the computing device to at least:
     execute an installation workflow of a bare metal hypervisor on the computing device, wherein the installation workflow configures the bare metal hypervisor on the computing device;
     obtain an inventory of DPU's installed within the computing device;
     determine a respective DPU capability for each of the plurality of DPU's from the inventory of DPU's;
     access a respective installation file for provisioning each of the plurality of DPU's;
     generate a respective DPU installation image for each of the plurality of DPU's based upon the respective DPU capability from the respective installation file;
     cause a respective server of a plurality of servers to host the respective DPU installation image to be started on the computing device;
     cause each of the plurality of DPU's to request the respective DPU installation image from the respective server of the plurality of servers; and
     provide the respective DPU installation image to each of the plurality of DPU's.

2. The system of claim 1, wherein at least one of the plurality of DPU's comprises at least one smart network interface card, the at least one smart network interface card comprising an additional CPU that can execute a storage task or a networking task on behalf of the CPU of the computing device.

3. The system of claim 1, wherein the first set of machine-readable instructions further cause the computing device to at least:
   cause each of the plurality of DPU's to execute a DPU installation workflow using the respective DPU installation image; and
   continue execution of the installation workflow of the bare metal hypervisor on the computing device in parallel with the DPU installation workflow.

4. The system of claim 1, wherein the installation file comprises a file archive comprising an uncompressed installation image for provisioning a DPU.

5. The system of claim 4, wherein the first set of machine-readable instructions generates a respective DPU installation image for each of the plurality of DPU's based upon the respective DPU capability from the installation file by providing the installation file to a respective image creation script that generates the respective DPU installation image.

6. The system of claim 1, wherein a first respective DPU installation image comprises an International Organization for Standardization (ISO) file and a second respective DPU installation image comprises a preboot execution environment (PXE) file.

7. The system of claim 1, wherein at least one of the plurality of DPU's is an offload card installed in the computing device.

8. A method, comprising:
   executing an installation workflow of a bare metal hypervisor on a computing device, wherein the installation workflow configures the bare metal hypervisor on the computing device;
   obtaining an inventory of DPU's installed within the computing device;
   determining a respective DPU capability for each of a plurality of DPU's from the inventory of DPU's;
   accessing a respective installation file for provisioning each of the plurality of DPU's;
   generating a respective DPU installation image for each of the plurality of DPU's based upon the respective DPU capability from the respective installation file;
   causing a respective server of a plurality of servers to host the respective DPU installation image to be started on the computing device;
   causing each of the plurality of DPU's to request the respective DPU installation image from the respective server of the plurality of servers; and
   providing the respective DPU installation image to each of the plurality of DPU's.

9. The method of claim 8, wherein at least one of the plurality of DPU's comprises at least one smart network interface card, the at least one smart network interface card comprising an additional CPU that can execute a storage task or a networking task on behalf of the CPU of the computing device.

10. The method of claim 8, further comprising:
    causing each of the plurality of DPU's to execute a DPU installation workflow using the respective DPU installation image; and
    continuing execution of the installation workflow of the bare metal hypervisor on the computing device in parallel with the DPU installation workflow.

11. The method of claim 8, wherein the installation file comprises a file archive comprising an uncompressed installation image for provisioning a DPU.

12. The method of claim 11, further comprising generating a respective DPU installation image for each of the plurality of DPU's based upon the respective DPU capability from the installation file by providing the installation file to a respective image creation script that generates the respective DPU installation image.

13. The method of claim 8, wherein a first respective DPU installation image comprises an International Organization for Standardization (ISO) file and a second respective DPU installation image comprises a preboot execution environment (PXE) file.

14. At least one non-transitory, computer-readable medium comprising:
a first non-transitory, computer-readable medium, comprising a first set of machine readable instructions that, when executed by a central processing unit (CPU) of a computing device, cause the computing device to at least:
execute an installation workflow of a bare metal hypervisor on the computing device, wherein the installation workflow configures the bare metal hypervisor on the computing device;
obtain an inventory of DPU's installed within the computing device;
determine a respective DPU capability for each of a plurality of DPU's from the inventory of DPU's;
access a respective installation file for provisioning each of the plurality of DPU's;
generate a respective DPU installation image for each of the plurality of DPU's based upon the respective DPU capability from the respective installation file;
cause a respective server of a plurality of servers to host the respective DPU installation image to be started on the computing device;
cause each of the plurality of DPU's to request the respective DPU installation image from the respective server of the plurality of servers; and
provide the respective DPU installation image to each of the plurality of DPU's.

15. The at least one non-transitory, computer-readable medium of claim 14, wherein at least one of the plurality of DPU's comprises at least one smart network interface card, the at least one smart network interface card comprising an additional CPU that can execute a storage task or a networking task on behalf of the CPU of the computing device.

16. The at least one non-transitory, computer-readable medium of claim 14,
wherein the first set of machine-readable instructions further cause the computing device to at least:
cause each of the plurality of DPU's to execute a DPU installation workflow using the respective DPU installation image; and
continue execution of the installation workflow of the bare metal hypervisor on the computing device in parallel with the DPU installation workflow.

17. The at least one non-transitory, computer-readable medium of claim 14, wherein the installation file comprises a file archive comprising an uncompressed installation image for provisioning a DPU.

18. The at least one non-transitory, computer-readable medium of claim 16, wherein the first set of machine-readable instructions generates a respective DPU installation image for each of the plurality of DPU's based upon the respective DPU capability from the installation file by providing the installation file to a respective image creation script that generates the respective DPU installation image.

19. The at least one non-transitory, computer-readable medium of claim 18, wherein a first respective DPU installation image comprises an International Organization for Standardization (ISO) file and a second respective DPU installation image comprises a preboot execution environment (PXE) file.

20. The at least one non-transitory, computer-readable medium of claim 14, wherein at least one of the plurality of DPU's is an offload card installed in the computing device.

* * * * *